(12) United States Patent
Tsafrir et al.

(10) Patent No.: US 9,535,802 B2
(45) Date of Patent: Jan. 3, 2017

(54) MANAGEMENT AND RECOVERY OF DISTRIBUTED STORAGE OF REPLICAS

(71) Applicant: Technion Research & Development Foundation Limited, Haifa (IL)

(72) Inventors: Dan Tsafrir, Haifa (IL); Eitan Rosenfeld, Tel Aviv (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 14/764,586

(22) PCT Filed: Jan. 30, 2014

(86) PCT No.: PCT/IL2014/050103
§ 371 (c)(1),
(2) Date: Jul. 30, 2015

(87) PCT Pub. No.: WO2014/118776
PCT Pub. Date: Aug. 7, 2014

(65) Prior Publication Data
US 2015/0370656 A1  Dec. 24, 2015

Related U.S. Application Data

(60) Provisional application No. 61/758,968, filed on Jan. 31, 2013, provisional application No. 61/821,323, filed on May 9, 2013.

(51) Int. Cl.
*G06F 11/00* (2006.01)
*G06F 11/14* (2006.01)
(Continued)

(52) U.S. Cl.
CPC .......... *G06F 11/1474* (2013.01); *G06F 3/065* (2013.01); *G06F 3/067* (2013.01); *G06F 3/0619* (2013.01);
(Continued)

(58) Field of Classification Search
USPC .................................................. 714/6.1, 6.2
See application file for complete search history.

(56) References Cited

U.S. PATENT DOCUMENTS 7,636,868 B2   12/2009   Hoffman et al.
2003/0188114 A1  10/2003  Lubbers et al.
(Continued)

FOREIGN PATENT DOCUMENTS

| WO | WO 2013/024485 | 2/2013 |
|----|----------------|--------|
| WO | WO 2014/118776 | 8/2014 |

OTHER PUBLICATIONS

International Preliminary Report on Patentability Dated Aug. 13, 2015 From the International Bureau of WIPO Re. Application No. PCT/IL2014/050103.

(Continued)

*Primary Examiner* — Sarai Butler

(57) ABSTRACT

A method of data replica recovery that is based on separate storage drives connected to a network where each storage drive has a storage space divided to contiguous storage segments and is electronically connected to a memory support component via a connection. Pairs of replicas, each of one of a plurality of data units, are stored in a manner that allows, in response to detection of a storage failure in one storage drive, to create replacement replicas in the memory support components of the other storage drives to assure that two replicas of each data unit can be found in the storage system.

20 Claims, 6 Drawing Sheets

(51) Int. Cl.
G06F 11/10 (2006.01)
G06F 11/20 (2006.01)
G06F 3/06 (2006.01)

(52) U.S. Cl.
CPC ....... *G06F 11/1088* (2013.01); *G06F 11/2094* (2013.01)

(56) References Cited

U.S. PATENT DOCUMENTS

| | | | |
|---|---|---|---|
| 2007/0271377 A1 | 11/2007 | Yamamoto et al. | |
| 2010/0325476 A1* | 12/2010 | Zhang | G06F 11/1662 714/4.1 |
| 2011/0113282 A1 | 5/2011 | De Spiegeleer et al. | |
| 2013/0086413 A1 | 4/2013 | Kaliannan et al. | |
| 2013/0173956 A1* | 7/2013 | Anderson | G06F 11/1076 714/6.24 |
| 2014/0025993 A1* | 1/2014 | Avadhanam | G06F 11/3672 714/32 |
| 2014/0195847 A1* | 7/2014 | Webman | G06F 11/2094 714/6.22 |

OTHER PUBLICATIONS

International Search Report and the Written Opinion Dated Jun. 17, 2014 From the International Searching Authority Re. Application No. PCT/IL2014/050103.
Borthakur "HDFS Archtiecture Guide", The Apache Software Foundation, p. 1-14, 2008.
Burke "1.24: Something You Should Know (About XIV)", The Storage Anarchist, A Blog About Advanced Storage and Technology, Written From a Unique Perspective, Blog Post by Chief Strategy Officer for the Symmetrix & Virtualization Product Group at EMC Information Infrastructure Products, 13 P., Sep. 5, 2008.
Calder et al. "Windows Azure Storage: A Highly Available Cloud Storage Service With Strong Consistency", ACM Symposium on Operating Systems and Principles, SOSP '11, Cascais, Portugal, Oct. 23-26, 2011, p. 142-157, Oct. 2011.
Chen et al. "RAID: High-Performance, Reliable Secondary Storage", ACM Computer Surveys, 26(2): 145-185, Jun. 1994.
Dholakia et al. "A New Intra-Disk Redundancy Scheme for High-Reliability RAID Storage Systems in the Presence of Unrecoverable Errors", ACM Transactions on Storage, 4(1/Art.1): 1-42, May 2008.
Dufrasne et al. "IBM XIV Storage System Gen3 Architecture, Implementation, and Usage", IBM Redbooks, IBM Corporation, International Technical Support Organization, 5th Ed., p. 1-430, Jul. 2012.
Ford Jr. et al. "Maximal Flow Through a Network", Canadian Journal of Mathematics, 8: 399-404, 1956.
Ghemawat et al. "The Google File System", ACM Symposium on Operating Systems and Principles, SOSP '03, Bolton Landing, New York, USA, Oct. 19-22, 2003, p. 29-43, Oct. 2003.
Hopcroft et al. "An N5/2 Algorithm for Maximum Matchings in Bipartite Graphs", SIAM Journal on Computing, 2(4): 225-231, Dec. 1973.
Hwang et al. "RAID-X: A New Distributed Disk Array for I/O-Centric Cluster Computing", Proceedings of the 9th IEEE International Symposium on High Performance Distributed Computing, HPDC '00, Pittsburgh, PA, USA, Aug. 1-4, 2000, p. 279-286, 2000.
Kuhn "The Hungarian Method for the Assignment Problem", Naval Research Logistic Quarterly, 2(1-2): 83-97, 2006.
Mills-Tettey et al. "The Dynamic Hungarian Algorithm for the Assignment Problem With Changing Costs", Technical Report CMU-RI-TR-07-27, Robotics Institute, Carnegie Mellon University, Pittsburg, PA, USA, Research Showcase, Paper 149: Jul. 1-13, 2007.
Nightingale et al. "Flat Datacenter Storage", Proceeding of the 10th USENIX Symposium on Operating Systems Design and Implementation, OSDI '12, p. 1-15, 2012.
OpenStack "Open Source Software for Building Private and Public Clouds", OpenStack.org, Powered by Rackspace Cloud Computing, Jan. 2013.
OpenStack Foundation "Swift Architectural Overview", Swift 1.7.6 Developmental Documentation, OpenStack Foundation, Jan. 2013.
Pinheiro et al. "Failure Trends in a Large Disk Drive Population", Proceedings of the 5th USENIX Conference on File and Storage Technologies, FAST '07, p. 17-28, Feb. 2007.
Savage et al. "AFRAID—A Frequently Redundant Array of Independent Disks", Proceedings of the 1996 Annual Conference on USENIX Annual Technical Conference, San Diego, CA, USA, Jan. 22-26, 1996, ATEC '96, p. 27-39, Jan. 1996.
Schroeder et al. "Disk Failures in the Real World: What Does an MTTF of 1,000,000 Hours Mean to You?", Proceedings of the 5th USENIX Conference on File and Storage Technologies, FAST '07, San Jose, CA, USA, Feb. 14-16, 2007, p. 1-16, Feb. 2007.
Stodolsky et al. "Parity Logging. Overcoming the Small Write Problem in Redundant Disk Arrays", Proceedings of the 20th Annual International Symposium on Computer Archtiecture, San Diego, CA, USA, May 16-19, 1993, p. 1-12, May 1993.
Thatcher et al. "Nand Flash Solid State Storage for the Enterprise. An In-Depth Look at Reliability", Solid State Storage Initiative, SNIA, 16 P., Apr. 2009.
Wang et al. "Gnothi: Separating Data and Metadata for Efficient and Available Storage Replication", USENIX ATC'12 Proceedings of the 2012 USENIX conference on Annual Technical Conference, Dec. 31, 2012. Section 5.3.
Wu et al. "Work/Out: I/O Workload Outsourcing for Boosting RAID Reconstruction Performance", Proceedings of the 7th USENIX Conference on File and Storage Technologies, FAST '09, p. 239-252, 2009.

* cited by examiner

US 9,535,802 B2

MANAGEMENT AND RECOVERY OF DISTRIBUTED STORAGE OF REPLICAS

RELATED APPLICATIONS

This application is a National Phase of PCT Patent Application No. PCT/IL2014/050103 having International filing date of Jan. 30, 2014, which claims the benefit of priority under 35 USC §119(e) of U.S. Provisional Patent Application Nos. 61/758,968 filed on Jan. 31, 2013 and 61/821,323 filed on May 9, 2013. The contents of the above applications are all incorporated by reference as if fully set forth herein in their entirety.

FIELD AND BACKGROUND OF THE INVENTION

The present invention, in some embodiments thereof, relates to data management and recovery and, more specifically, but not exclusively, to management and recovery of distributed storage of replicas.

Storage systems often employ data replication to defend against disk failures. The data is partitioned into small contiguous units, and each unit is stored on more than one disk. If one replica happens to reside on a failing disk, the system may utilize another replica to recover.

Replication ensures consistency between redundant resources, such as software or hardware components, improves reliability, fault-tolerance, or accessibility. The replication may be data replication if the same data is stored on multiple storage drives. The replication process should be transparent to an external user. Besides consistency of replicas, the server nodes in a distributed system should be evenly loaded with replicas so that optimal application performance and network traffic is achieved.

A key parameter of replicating systems is the number of replicas to maintain for each data unit. This parameter reflects a tradeoff between safety and efficiency. Storing fewer replicas increases the risk of simultaneously losing all the replicas of a data unit due to several temporally adjacent disk failures. Conversely, storing additional replicas it reduces the effective storage size, as k replicas translate to 1/k usable space, induces higher network traffic, as more disks have to be synchronized upon data changes, and translates to greater energy consumption, because write operations induce additional disk/network activity, and because systems must utilize a higher number of disks to attain the same effective storage space.

SUMMARY OF THE INVENTION

According to some embodiments of the present invention, there is provided a method of data replica recovery, The method comprises providing a distributed storage comprising a plurality of separate storage drives which are connected to a network, each one of the plurality of storage drives having a storage space divided to a plurality of contiguous storage segments and is electronically connected to a memory support component via a connection, storing a plurality of pairs of replicas in the plurality of storage drives, each pair includes first and second replicas of a data unit from a plurality of data units of a dataset, detecting a storage failure of one of the plurality of storage drives, the storage drive stores a first member of a certain pair from the plurality of pairs, and forwarding a message indicative of the storage failure via the network to trigger a storage of a second member of the certain pair into a respective the memory support component electronically connected via a respective the connection to another of the plurality of storage drives.

Optionally, the plurality of separate storage drives are installed in a plurality of different hosting computing units which are connected to the network.

Optionally, the storing is performed so that replicas of any of the plurality of pairs are stored in contiguous storage segments of different storage drives and so that any couple of the plurality of storage drives shares only one of the plurality of pairs.

Optionally, the detecting comprises monitoring an I/O controller of the first of the plurality of storage drives and detecting the storage failure based on the outcome of the monitoring.

Optionally, each data unit is a meta-structure containing a plurality of storage protocol replicas.

Optionally, the number of the plurality of contiguous storage segments is smaller than the number of the plurality of storage drives.

Optionally, the plurality of contiguous storage segments having an equal size.

More optionally, the equal size is a derivative of a storage size of each one of the plurality of separate storage drives.

Optionally, each contiguous storage segment having a size of at least 0.5 gigabyte.

Optionally, the connection is a wire connection.

Optionally, the detecting is performed locally by a module in the one of the plurality of storage drives.

According to some embodiments of the present invention, there is provided an external memory device that comprises an integral memory unit, a controller communication monitoring unit which reads a communication between an input/output (I/O) controller of a storage drive which stores a first replica from a pair of the replicas of a data unit and the storage drive, a storage management module which analyzes the communication for detecting a storage failure event pertaining to a contiguous storage segment of the storage drive that stores the first replica and forwards a message indicative of the storage failure event to another external memory device via a network, and a network interface which receives a second message indicative of a remote storage failure event pertaining to a second replica of the pair via the network and uses the memory unit to backup the first replica of the pair in response to the message. The another external memory device receives the first message and uses another integral memory unit to backup the second replica of the pair in response to the first message.

More optionally, the external memory device further comprises a housing that encapsulates the integral memory unit, the communication, and the network interface.

Optionally, the memory support component is an additional storage drive hosted at a common host with a respective separate storage drive from the plurality of separate storage drives.

According to some embodiments of the present invention, there is provided a distributed storage for storing a plurality of data replicas. The storage comprises a plurality of memory support components each connected via a connection to another storage drive of a distributed storage comprising a plurality of separate storage drives which are connected to a network, each one of the plurality of storage drives having a storage space divided to a plurality of contiguous storage segments, the plurality of separate storage drives stores a plurality of pairs of replicas, each pair of replicas is of a data unit of a plurality of data units of a dataset, and a plurality of storage management modules each installed to monitor another of the plurality of the storage drives and to detect locally a storage failure thereof, the storage failure is related to a first member of a certain pair from the plurality of pairs. Each one of the plurality of storage management modules forwards a message indicative of the failure to trigger storage of a second member of the certain pair into a respective the memory support component that is electronically connected via a respective the connection to a second of the plurality of storage drives.

Optionally, each one of the memory support components is electronically connected via a wire to monitor an input/output (I/O) controller of a single storage drive of the plurality of separate storage drives.

Optionally, each one of the plurality of separate storage drives is control by a different hosting computing unit that is connected to the network.

Optionally, the plurality of pairs of replicas are distributed among the plurality of separate storage drives so that replicas of any of the plurality of pairs are stored in contiguous storage segments of different storage drives and so that any couple of the plurality of storage drives shares only one of the plurality of pairs.

According to some embodiments of the present invention, there is provided a method of data replica recovery. The method comprises providing a distributed storage comprising a plurality of separate storage drives which are connected to a network, each one of the plurality of storage drives having a storage space divided to a plurality of contiguous storage segments and is electronically connected to a memory support component via a connection, storing a plurality of pairs of replicas in the plurality of storage drives, each pair includes first and second replicas of a data unit of a plurality of data units of a dataset, maintaining in each memory support component an erasure code of a subset of the plurality of replicas, the subset being stored in respective the plurality of contiguous storage segments of a certain of the plurality of storage drives, locally detecting in a storage failure of a certain storage drive from the plurality of storage drives, and using a combination of the erasure code plurality of replicas and data from other storage drives of the plurality of storage drives to recover the certain storage drive.

Optionally, the plurality of pairs of replicas are stored so that replicas of any of the plurality of pairs are stored in contiguous storage segments of different storage drives and so that any couple of the plurality of storage drives shares only one of the plurality of pairs.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
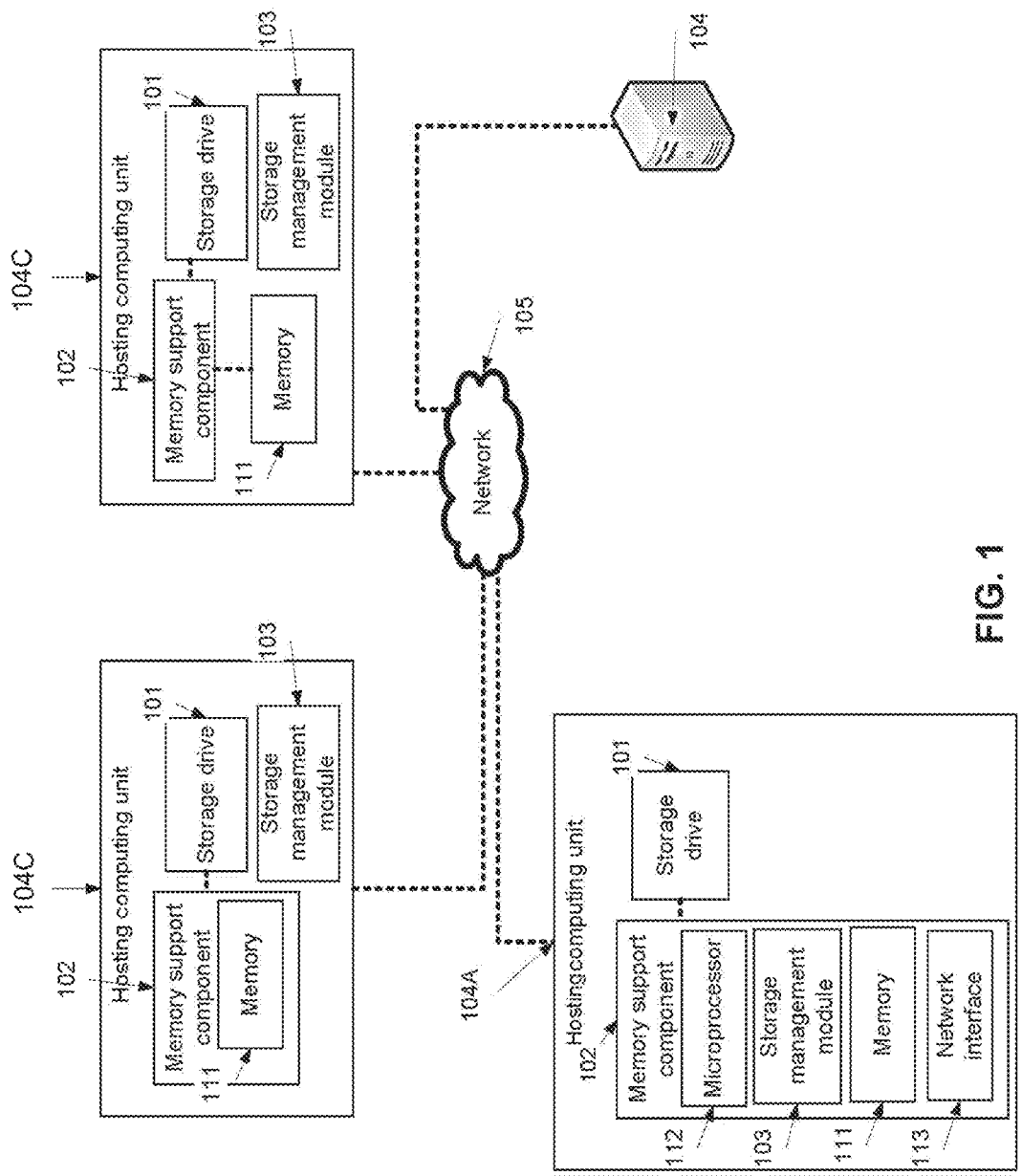
FIG. 1 is a schematic illustration of a storage system for recovery of replicas of data units using memory support components, according to some embodiments of the present invention.

The present invention, in some embodiments thereof, relates to data management and recovery and, more specifically, but not exclusively, to management and recovery of distributed storage of replicas.

According to some embodiments of the present invention, there are provided methods and systems of managing the storage of independent data units of a dataset in a storage drives and using support memory units which are electronically connected to the storage drives to backup local replicas of the independent data units in real time when a storage drive failure is detected. Each independent data units is represented in the storage system by a pair of replicas. The replicas are distributed so that data in any of the storage drive can be recovered from replicas copied to the memory support components only after the storage drive has failed.

The systems and methods use the support memory units to mitigate the risk of experiencing permanent data loss due to temporally adjacent disk failures, while employing only a pair of replicas per data unit in storage drives of a distributed storage system. Maintaining only two replicas for each data unit is facilitated by instructing each support memory unit to copy a replica of a selected (single) data unit from a contiguous storage segment of the electronically connected storage drive, for example wired thereto, when storage drive failure is detected. Copying a single data unit from each storage drive may be made possible by distributing replicas so that replicas of a certain pair of replicas are stored in contiguous storage segments of different storage drives and so that any couple of storage drives shares only a single pair of the pairs of replicas. After a failure, the contiguous storage segments which were mirrored on a failed disk, and therefore are no longer mirrored, are copied to the respective memory support units which are connected to the respective storage drives.

The copying significantly reduces the risk of data loss due to temporally adjacent disk failures.

According to some embodiments of the present invention, there are provided methods and systems of generating an erasure code per storage drive of a distributed storage in a manner that facilitates a full reconstruction of a multi replica data when a mirror of one of the replicas cannot be found in the distributed storage. The methods and systems maintain an erasure code generated by combining data from replicas of independent data units stored in a support memory unit that is electronically connected to one of the storage drives of the distributed storage system, for example wired thereto. The erasure code allows recovering all the lost data in the failed storage drive even if no mirror replica can be found for one of the replicas which used to be backed up therein. Such a recovery may be made possible by distributing the replicas so that replicas of a certain pair of replicas are stored in contiguous storage segments of different storage drives of the storage system and so that any couple of storage drives shares only a single pair of the pairs of replicas.

The above methods and systems allow storage managers, such as cloud providers, to reduce the number of replicas they use, from three or more to two.

As the methods and systems of the above embodiments distribute the storage of replicas so that any couple of storage drives shares only a single pair of the pairs of replicas, the time involved in reconstructing a failing storage drive is reduced as the data of a failed storage drive may be reconstructed from a relatively large number of sources, optionally at least partly simultaneously. For example, assuming a typical disk throughput of 50 megabyte (MB) per second (s), reconstructing a 2 terabyte (TB) storage drive takes more than 11 hours. During this interval, the storage system is vulnerable to additional failures that might cause data loss. The recovery scheme in the above methods and systems allow reconstructing a new disk in a distributed manner, allowing any number of storage drives to participate in the recovery by reading/writing a relatively small portion of the data. This procedure may dramatically reduce the recovery time. It should be noted that the price of using strip scheme for fast recovery time is an increased risk of data loss due to multiple disk failures. The risk is greater because every disk is striped across every other disk, which means any two simultaneously failing disks would have a non-empty intersection that would be permanently lost. Importantly, the probability to experience some data loss increases after a double disk failure when each disk is striped across all others is proportional to size of the system. Namely, more disks imply a greater risk. In contrast, more traditional storage systems arrange disks in, e.g., small sub clusters of redundant array of independent disks 5 (RAID5) configurations, such that data loss can occur only if the double disk failure happens in the same sub-cluster, an event with a much lower probability.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a schematic illustration of a storage system 100 for managing pairs of replicas of data units in contiguous storage segments using memory support components 102 for prompt local backup of the replicas, according to some embodiments of the present invention. The storage system 100 has a plurality of separate storage drives 101, such as disks, random access memory (RAM) units and any combination of such components. Each storage drive 101 is electronically connected, for example wired, to a memory support component 102 and optionally managed by a storage management module 103. The memory support component 102 may include an independently managed memory unit 111 or an association to a memory controlled by a hosting computing unit 104 of the storage drive 101. It should be noted that the storage drives 101 may have the same storage space and/or a different storage space. The hosting computing unit 104 may be any processor based device, a laptop, a desktop, a server, a tablet, a Smartphone, and/or any network node and/or a device that includes a processor 105. The memory support component 102 may be a detachable and/or a fixed device that is set to ne electronically connected to the storage drive 101, for example via the input and/or output (I/O) controller of the storage drive 101. The memory support component 102 includes a memory unit 111, for example a nonvolatile memory, such as a flash memory and a dynamic random access memory (DRAM) and/or a volatile memory.

Each storage drive 101 is associated with a storage management module 103 set to communicate with other storage management modules 103 via a communication network 105, during a recovery process, for example as described below and outlined above. The communication network 105 may be the internet or an Ethernet. The storage management module 103 may be installed in the memory support component 102, for example as shown in hosting computing unit 104A, and/or in the memory of the hosting computing unit, for example as shown in hosting computing unit 104C.

Optionally, when the memory support component 102 hosts the storage management module 103, as shown at 104A, it includes a processing unit 112, for example a microprocessor, to independently process I/O traffic that flows to and/or from the storage drive to which it is attached, and enough memory to allow it to store at least one data element stored in a contiguous storage segment of the storage drive 101 to which it is connected. Optionally, the size of the memory 111 sufficient for only one replica. Such a memory support component 102 may interpose the I/O between the storage drive 101 and its controller 151, for example as illustrated FIG. 2, for instance on a serial advanced technology attachment (SATA) and/or serial attached small computer system interface (SCSI) (SAS) connection 152 between the I/O controller 151 and the storage drive 101. Optionally, a designated controller communication monitoring unit is used for the monitoring the above controller communication.

Optionally, the memory support component 102 includes a housing that contains its components, for example having dimensions of about 2×0.5×4 centimeters (cm) and/or the like. Optionally, the memory support component 102 is implemented as an integrated circuit (IC) integrated into the certain storage drive 101 and/or its host. The memory of the memory support component 102 may be accessed independently from the storage drive 101, for example via a separate communication line. Optionally, the memory support component 102 is powered by a power source separate from the power source of the certain storage drive 101, for example from a battery, optionally rechargeable. In such a manner, the memory component 102 is more resistant to electric shocks that may affect the certain storage drive 101.

Each storage drive 101 is set to store a plurality of contiguous storage segments. The number of contiguous storage segments is optionally a derivative of the number of storage drives 101. For example, if the storage system 100 includes N storage disks each having a storage space of S, then each storage drive 101 includes N−1 contiguous data units each having a storage space of S/(N−1). It should be noted that any number of storage drives may be used, for example 2, 10, 100, 500, or any intermediate or larger number of storage drives. For instance, if 101 storage drives are used, each one having a storage space of 1 TB, than the storage space of each contiguous storage segment is set to be 1 TB/100=10 gigabyte (GB).

Figure 3:
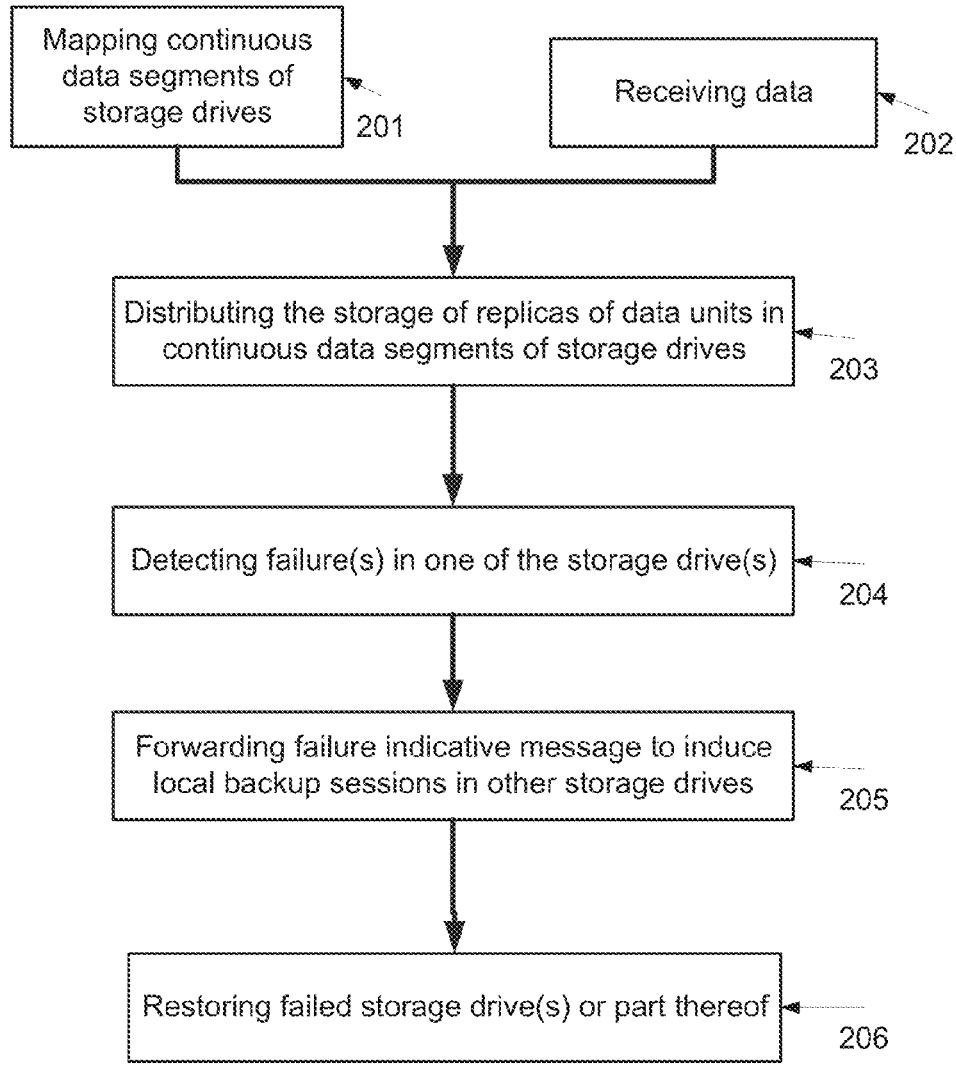
FIG. 3 is a flowchart of a method of managing storage and recovery of multiple replicas of data units in contiguous storage segments of different storage drives, according to some embodiments of the present invention.

Reference is now also made to FIG. 3, which is a flowchart 200 of a method of managing storage of multiple data units in a plurality of distributed contiguous storage segments, according to some embodiments of the present invention. The method 200 is based on storing two replicas of each data unit in a contiguous storage segment of another storage drive, such as 101. The replica is stored in a manner that allows performing a prompt local backup in the respective memory support component 102 that electronically connected to the storing storage drive 101, for instance when being notified that the other replica may have been lost, for example corrupted and/or deleted, for instance by a message as described below. The prompt local backup allows maintaining relatively high fault resistance storage when only two replicas of each data unit are kept. It should be noted that the method may adapted to handle more than two replicas. In such embodiments, the messages are distributed to update all replicas, similarly to the described below. Storage distribution may be adapted to handle more than two replicas, for example according to a known distribution scheme.

It should be noted that the term storage segment may address a range of logical block addresses on a storage drive. Note that the units of data that are copied to the memory support component 102 or computed into erasure codes (as described below) may not be limited to ranges of logical block addresses.

Optionally, the segments vary in size. In these embodiments, the memory support unit has a memory capacity of the largest storage segment on the respective drive. The largest storage segment may be transferred to the memory support unit when it is left unmirrored after a failure, for example as outlined above and described below. Erasure codes may be generated as if all segments have the size of the largest segment, for example by treating smaller segments as if they have trailing 0's to make up for any size disparities.

First, as shown at 201, a plurality of storage drives, such as 101, are mapped, for example by a data management unit. As described above, the storage space of each storage drive is divided to contiguous storage segments. The mapping optionally includes associating each contiguous storage segment in one storage drive 101 with a contiguous storage segment in another storage drive 101. In use, as described below, associated contiguous storage segments store replicas of a certain data unit and therefore this mapping is used for triggering a backup session for backing up one replica when an identical replica fails.

Now, as shown at 202, data for storage is received. The data is divided to data units, each optionally having a size of a contiguous storage segment. Now replicas of the data units are stored in the storage drives, distributed so that two replicas of each data unit, as shown at 204, are separately stored in two contiguous storage segments each managed by another storage drive. It should be noted that a replica, as used herein, is a copy of a data unit (e.g. original copy or a mirror copy). The replicas are distributed so that there is no more than one pair of two replicas of the same data unit in the storage space of a couple of storage drives 101. In such a manner, a couple of storage drives 101 actually share copies of only one data element. This distribution is maintained even if the mapping is updated, for instance when the number of storage drives changes and/or as an outcome of load rebalancing. In such a manner, the storage system 100 maintains the following single mirroring rule: a replica of data unit stored in a contiguous storage segment of one storage drive 101 is mirrored by in another contiguous storage segment of another storage drive 101. In addition, the storage system 100 maintains the following single sharing rule: no more than a single replica of a certain data unit is shared by any two storage drives 101.

For instance, the following Table 1 exemplifies how contiguous storage segments may be mapped in a 7-disk system, such that single sharing and single mirroring rules are satisfied:

TABLE 1

|   | $D_1$ | $D_2$ | $D_3$ | $D_4$ | $D_5$ | $D_6$ | $D_7$ |
|---|---|---|---|---|---|---|---|
| $S_1$ | 1 | 2 | 3 | 4 | 5 | 6 | 7 |
| $S_2$ | 7 | 1 | 2 | 3 | 4 | 5 | 6 |
| $S_3$ | 8 | 9 | 10 | 11 | 12 | 13 | 14 |
| $S_4$ | 13 | 14 | 8 | 9 | 10 | 11 | 12 |
| $S_5$ | 15 | 16 | 17 | 18 | 19 | 20 | 21 |
| $S_6$ | 19 | 20 | 21 | 15 | 16 | 17 | 18 |

The contiguous storage segments are associated according to an association function, for example in the case of the storage drives defined in Table 1, the association function is as follows:

$$f(i,j) = \begin{cases} (i+1, \quad (j+\frac{i}{2}+1)\% N), & \text{even } i \\ (i-1, \quad (j-\frac{i-1}{2}-1)\% N), & \text{odd } i \end{cases} \quad \text{Function 1}$$

where N=7, j denotes an index number of a storage drive (column) and i denotes an index of a contiguous storage segment on that storage drive (row).

Optionally, replicas within the contiguous storage segments may be managed as a meta-structure that is further segmented according to various protocols, for example according to Google™ file system (GFS), Hadoop distributed file system (HDFS), fixed distributed system (FDS), Azure™, Swift™, and/or any combination thereof.

Optionally, the data unit in each contiguous storage segment is further segmented according to different granularity for example 0.1 MB, 1 MB, 2 MB, 8 MB, 13 MB, and 19 MB or any intermediate or larger units. In such embodiments, the contiguous storage segment layout is used as a meta-structure that determines the placement of protocol replicas. For example, assume a storage protocol sets 1 MB protocol replicas. Given such a protocol replica, the storage system 100 sets the protocol replica as a sub segment of a data unit that replicas thereof are distributed, for instance as described above. For example, the contiguous storage segments are associated as described above and an offset of each protocol replica (within it's the contiguous storage segment) in one replica of data unit is set to be identical to the offset in the second replica of the same data unit.

Figure 2:
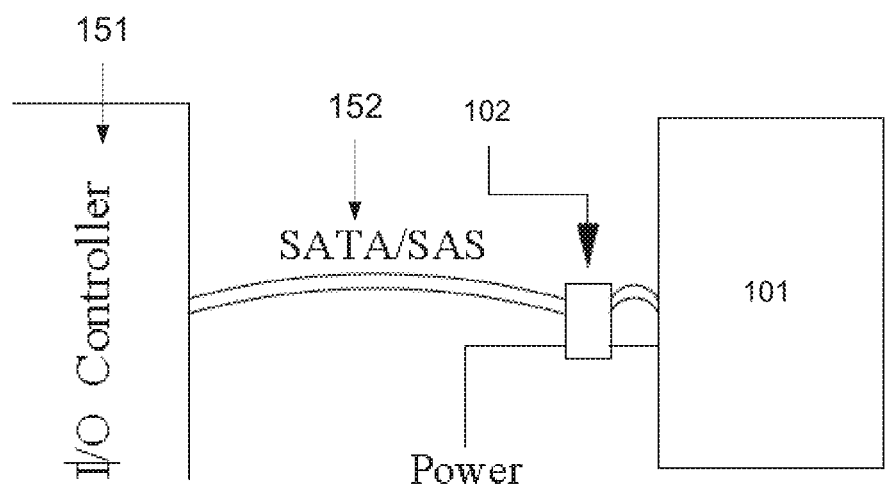
FIG. 2 is a schematic illustration of a connection between a memory support component and a storage drive, according to some embodiments of the present invention.

Now, as shown 204, the robustness of the storage drives and/or the contiguous storage segments is monitored for example by eavesdropping to the I/O controllers of the storage drives 101 for detecting failure events (see FIG. 2 for an exemplary eavesdropping allowing arrangement). For example, each storage management module 103 monitors the traffic in each respective I/O controller to detect which storage drive and/or which contiguous storage segment(s) in which storage drive failed.

As shown at 205, upon detection of a failure event of a certain storage drive, or of one or more contiguous storage segment(s) thereof, a message notifying the failure is sent to some or all of the other storage drives, triggering local backup of replicas of data units which have been backed up in the failed storage drive (e.g. estimated as failed in response to a failure event detection) and/or in the failed contiguous storage segment(s) thereof (e.g. estimated as failed in response to a failure event detection).

Optionally each storage management module 103 includes a network interface for sending and/or receiving messages. In another example, the network interface is a module 113 that receives messages via a communication module of a hosting computing unit, for example as depicted in 104A.

For example, when one of the storage management modules 103 identifies a failure event, it forwards a message indicative of the failed storage drive and/or contiguous storage segment(s) to all or some of the other storage management modules 103 in the storage system 100. The message may be broadcasted, multicasted and/or otherwise forwarded over the communication network 105, for instance as a *a storage drive D fails, the storage management module 103 associated therewith triggers the labeling of the replicas stored in storage drive D as risky. A message is forwarded to all or some of the other storage management modules 103, instructing each one of them to initiate a local backup session of a replica of the only data unit used to be stored in storage drive D and now labeled as risky. The replicas for local backup session are optionally selected using the above created association mapping. During the local backup session, each storage management module 103 instructs the copying of the selected replica to the memory of the memory support component 102. As replicas of data elements are optionally distributed so that each couple of storage drives share the storage of replicas of only one data element (in any first and second storage drives, the first storage drive backs up only one data element from the data elements backed up in the second storage drive) the memory support component 102 is required to copy a replica from only one contiguous storage segment. The different storage drives perform the backup session substantially simultaneously, distributing the computational complexity involved in copying data and reducing the required bandwidth as replicas are not forwarded over the communication network but rather copied using a local connection between the memory support component 102 and the storage drive. For example, assuming a disk size of 1 TB, a size of a contiguous storage segment is 10 GB, and a disk bandwidth of 50 MB/s, the storage system may replicate all the content of a storage drive D in less than 3.5 minutes, when the recovery bandwidth is not constrained. Once the replicas identical to the replicas which have been stored in D (or part thereof) before the failure have been backed up in the memory support components 102, the risk for losing data is reduced. When the replicas are locally stored in the memory support components, there are two safe replicas (not identified as being at risk) of each data element are found in the storage space of the storage system (one in the memory support component and the other in the storage drive). It should be noted that the data elements are stored in the memory support components without accessing the network, thereby providing cost-effective fast recovery that does not use an expensive network infrastructure with full bisection bandwidth.

As shown at 206, the above allows restoring a failed drive and/or contiguous storage segments thereof by collecting the data from the memory support components, for example via the communication network. The data may be collected simultaneously or substantially simultaneously (e.g. few replicas at the time) allowing reducing the restore time in relation to a restoration from a single memory store.

Optionally, the mapping may be updated to associate the contiguous storage segments of a new storage drive. It should be noted that mapping may also be updated when new storage drives are added to and/or removed from the storage system and/or during a proactive balance load across the used storage drives (in resolution of contiguous storage segments), for example when some storage drive store data accessed more than data in other storage drives.

According to some embodiments of the present invention, there are provided methods and systems wherein a memory support component connected to each of a plurality of storage drives is used to store an erasure code, also called error correcting code, such as exclusive or (XOR), generated by combining replicas stored in the storage drive. The methods are optionally implemented using a storage system such as depicted in FIG. 1. By maintaining erasure codes in the memory support components, a solution that is less sensitive or even immune to occasional bad sectors is provided. In such embodiments, each storage management module 103 instructs respective a memory support component 102 to maintain continually an erasure code, for example the parity (XOR), of the replicas stored in the contiguous storage segment(s) of a corresponding storage drive, for instance as depicted in FIG. 4, and not to perform a local backup session in response to failure messages as described above.

Figure 5:
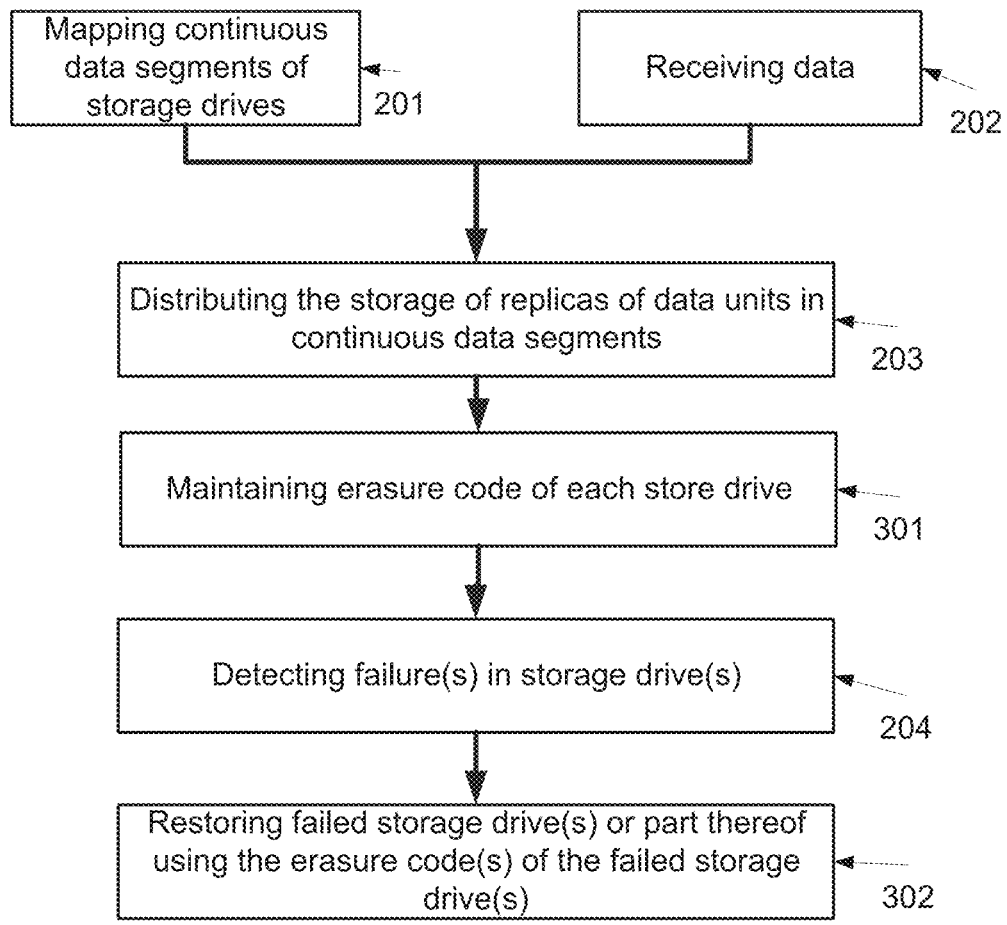
FIG. 5 is a flowchart of method of managing storage and recovery of multiple replicas using erasure code(s) stored in memory support component(s), according to some embodiments of the present invention.

For example reference is now made to FIG. 5, which is a flowchart of a method of restoring data element replica in a storage device using memory support components maintaining erasable codes, according to some embodiments of the present invention. 201-204 are as depicted in FIG. 3; however, FIG. 5 also depicts blocks 301 and 302 pertaining to the maintaining of erasable codes and the usage thereof for recovery.

As shown at 301 each storage drive maintains, optionally continually, an erasure code of the data elements which are stored therein. As shown at 302, during a recovery of a failed storage drive, the erasure code is used, together with replicas from one or more other storage drives, to restore the replicas of the failed storage drive. As described above, data is distributed sp that no two storage drives share replicas of more than one data element. In such embodiments, when two (couple) of storage drives fail simultaneously, the data residing both failing storage drives, referred to herein as the intersection, is not lost as this data includes only data of a single data element (all the other data is backed up by replicas in other storage drives) that can be reconstructed from a combination of the erasure code stored in the memory support component 102 of the failed storage drive and data from one or more other storage drives. Each memory support component 102 stores a parity of replicas from the failing storage drive. Consequently, by utilizing the surviving replicas from operating storage drives and the parity from the memory support component 102, the lost replica may be reconstructed.

Figure 4:
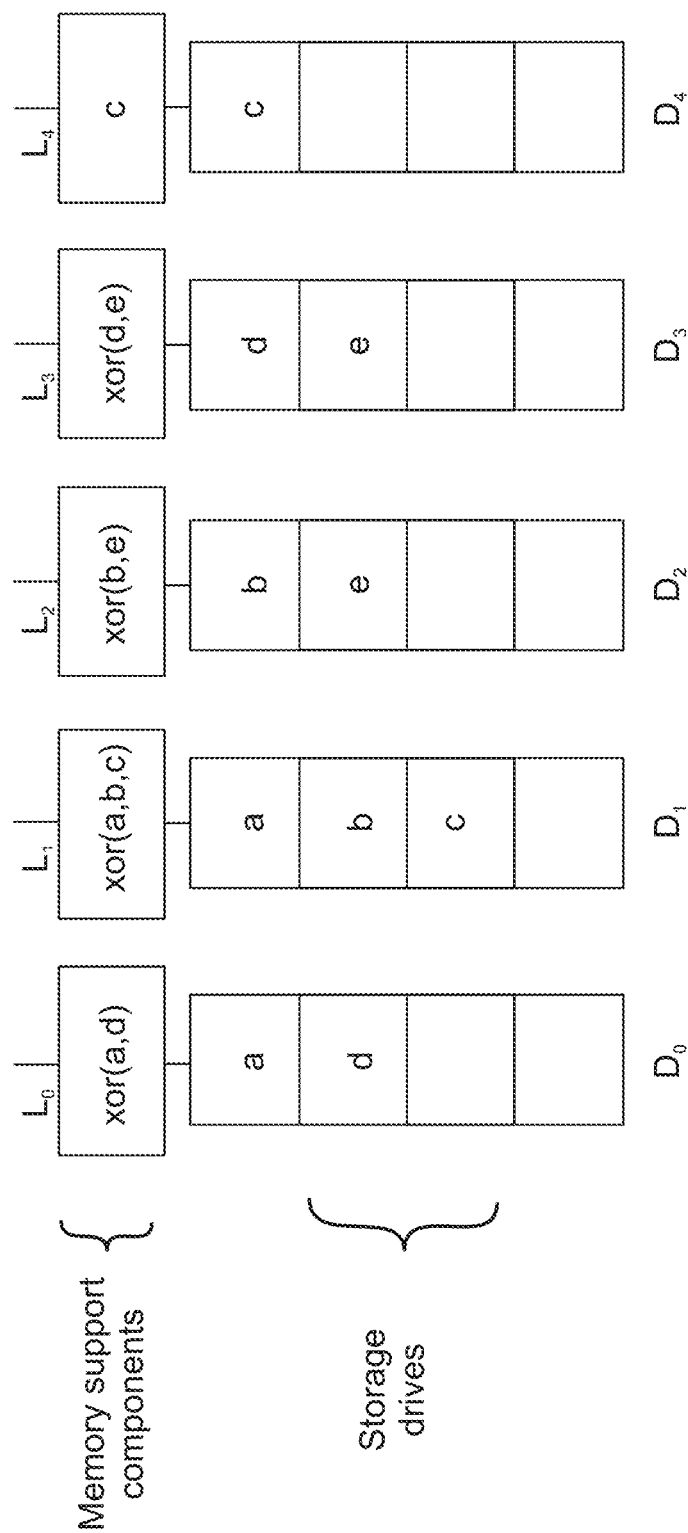
FIG. 4 is a schematic illustration of a set of storage drives each stores a set of replicas and connected to a memory support component that maintains an erasure code generated based on these replicas, according to some embodiments of the present invention.

For example, if storage drives $D_2$ and $D_3$ in FIG. 4 fail, all replicas of data element e are lost. Data element e may be recomputed using any of erasure codes of $D_2$ or $D_3$ and replicas of data elements in the operating storage drives, for instance $L_2 \oplus D_1$ and/or $L_3 \oplus D_0$. This flexibility further gives the storage system an ability to avoid hotspot risks during a reconstruction and contribute to the ability of coping with occasional bad sectors.

In some embodiments, erasure code, such as XOR, of N replicas may be used to recover a data unit in the event of a loss of both replicas thereof from the above storage system. In effect, on each disk the system stores N original replicas and an additional parity data unit (erasure code) in the memory support component to protect versus the loss of any one of the stored replicas. Optionally, the storage space of the memory support component is increased to fit an additional erasure code that allows recovering additional replicas which may have been lost. For example N original data replicas may be represented by two or more erasure codes, each having a size of a replica and stored in the memory support component, for example k erasure codes. In such embodiments, the memory support component has a storage capacity of k replicas. Consequently, the storage drive and the memory support component that is connected thereto maintain data that amounts to N+k replicas. The k erasure codes allow recovering any number of replicas as long as any N replicas of the N+k different replicas remains in the storage system, meaning at most k replicas are lost—then the lost replicas may be recovered.

Reference is now made to recovery of data after storage drive failure(s). After a storage drive failure, some replicas of data elements left unmirrored and has to be recovered. Optionally, the recovery maintains the above single sharing rule while minimizing load imbalance between disks. The single sharing rule is maintained throughout a recovery as it ensures that any lost data during the recovery is recoverable. Keeping the storage drives load balanced prevents a situation where some storage drives may become hotspots after being on the receiving end of many transfers from contiguous storage segments. Load balancing ensures that all transfers happen in parallel, shortening the recovery process. Thus, no disk should be on the receiving end of more than one replica transfer per failure recovery. Optimally, a recovery matches each sending storage drive with a receiving storage drive according to the above criteria. Optionally, the recovery process is set as a maximum matching problem between sending storage drives and receiving storage drives, for which all sending storage drives must be matched with a receiving storage drive. Maximum matching problem may be solved as described in FORD JR, L., AND FULKERSON, D. Maximal flow through a network. *Canadian Journal of Mathematics* 8 (1956), 399-404 and in HOPCROFT, J., AND KARP, R. An n^5/2 algorithm for maximum matching in bipartite graphs. *SIAM Journal on Computing* 2, 4 (1973), 225-231 which are incorporated herein by reference in its entirety.

Figure 6:
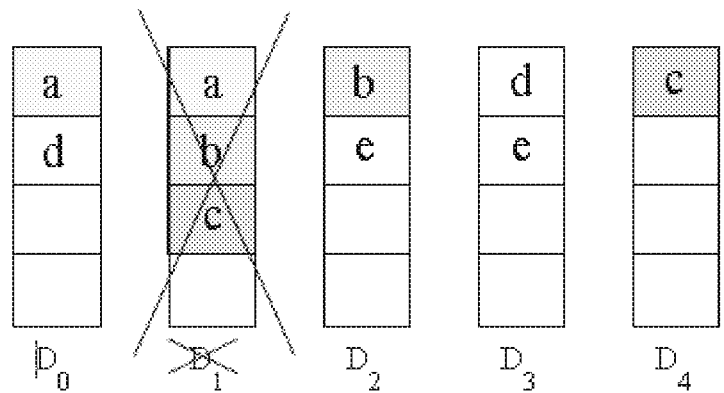
FIG. 6 is a schematic illustration of contiguous storage segments in each member of a set of storage drives.
Figure 7:
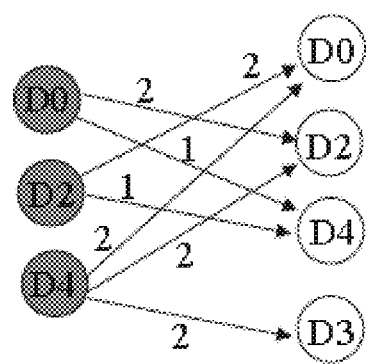
FIG. 7 is a schematic illustration of replica transfer between storage drives, according to some embodiments of the present invention.

For example, FIG. 6 depicts a failure of disk $D_1$, and the graph in FIG. 7 depicts sending storage drives 501 with edges to potential receiving storage drives 502 that may be matched. Optionally, costs are assigned to edges according to the amount of load on storage drive, applying a "minimum-cost" matching algorithm that finds the smallest total cost for the assignment, for example as described in KUHN, H. The Hungarian method for the assignment problem. *Naval research logistics quarterly* 2, 1-2 (2006), 83-97, which is incorporated herein by reference in its entirety. Optionally, edges are removed and costs are updated after each assignment, for example as described in MILLS-TETTY, G. A., STENTZ, A. T., AND DIAS, M. B. The dynamic Hungarian algorithm for the assignment problem with changing costs. Tech. Rep. CMU-RITR-07-27, Robotics Institute, Pittsburgh, Pa., July 2007 which is incorporated herein by reference in its entirety. This formulation provides that all sending storage drives are matched and that no receiving storage drive is matched with more than one sending storage drive.

Optionally, when there is a load difference greater than two replicas between the heaviest and lightest loaded storage drives, the system can be load balanced. Replicas can be transferred from heavier storage drives to lighter storage drives, provided that single sharing and single mirroring rules are maintained as result of the transfer.

Maintaining the single sharing rule may be at risk of being violated when a heavily loaded storage drive has a replica which is mirrored on a storage drive that the lighter storage drive already shares with. Transferring such a replica to the lighter storage drive results in the lighter storage drive sharing two replicas with another storage drive in the system. Fortunately, such a transfer is avoidable because the heavier storage drive has at least two more replicas than the lighter storage drive; thus there are at least two replicas which do not violate single sharing rule upon transfer. The final restriction is that if the heavier storage drive mirrors one of the lighter storage drive's replicas, the heavier storage drive must not send the shared replica. Otherwise, both replicas will reside on the same storage drive, violating single mirroring rule. These principles are directly applied when adding a storage drive to the storage system. The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, a unit, and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of data replica recovery, comprising:
providing a distributed storage comprising a plurality of separate storage drives which are connected to a network, each one of said plurality of storage drives having a storage space divided to a plurality of contiguous storage segments and is electronically connected to a memory support component via a connection;
storing a plurality of pairs of replicas in said plurality of storage drives, each said pair includes first and second replicas of a data unit from a plurality of data units of a dataset;
detecting a storage failure of one of said plurality of storage drives, said storage drive stores a first member of a certain pair from said plurality of pairs; and
forwarding a message indicative of said storage failure via said network to trigger a storage of a second member of said certain pair into a respective said memory support component electronically connected via a respective said connection to another of said plurality of storage drives.

2. The method of claim 1, wherein said plurality of separate storage drives are installed in a plurality of different hosting computing units which are connected to said network.

3. The method of claim 1, wherein said storing is performed so that replicas of any of said plurality of pairs are stored in contiguous storage segments of different storage drives and so that any couple of said plurality of storage drives shares only one of said plurality of pairs.

4. The method of claim 1, wherein said detecting comprises monitoring an I/O controller of said first of said plurality of storage drives and detecting said storage failure based on the outcome of said monitoring.

5. The method of claim 1, wherein said each said data unit is a meta-structure containing a plurality of storage protocol replicas.

6. The method of claim 1, wherein the number of said plurality of contiguous storage segments is smaller than the number of said plurality of storage drives.

7. The method of claim 1, wherein said plurality of contiguous storage segments having an equal size.

8. The method of claim 7, wherein said equal size is a derivative of a storage size of each one of said plurality of separate storage drives.

9. The method of claim 1, wherein each said contiguous storage segment having a size of at least 0.5 gigabyte.

10. The method of claim 1, wherein said connection is a wire connection.

11. The method of claim 1, wherein said detecting is performed locally by a module in said one of said plurality of storage drives.

12. An external memory device, comprising:
an integral memory unit;
a controller communication monitoring unit which reads a communication between an input/output (I/O) controller of a storage drive which stores a first replica from a pair of said replicas of a data unit and said storage drive;
a storage management module which analyzes said communication for detecting a storage failure event pertaining to a contiguous storage segment of said storage drive that stores said first replica and forwards a message indicative of said storage failure event to another external memory device via a network; and
a network interface which receives a second message indicative of a remote storage failure event pertaining to a second replica of said pair via said network and uses said memory unit to backup said first replica of said pair in response to said message;
wherein said another external memory device receives said first message and uses another integral memory unit to backup said second replica of said pair in response to said first message.

13. The external memory device of claim 12, further comprising a housing that encapsulates said integral memory unit, said communication, and said network interface.

14. The external memory device of claim 12, wherein said memory support component is an additional storage drive hosted at a common host with a respective separate storage drive from said plurality of separate storage drives.

15. A distributed storage system for storing a plurality of data replicas, comprising:

a plurality of memory support components each connected via a connection to another storage drive of a distributed storage comprising a plurality of separate storage drives which are connected to a network, each one of said plurality of storage drives having a storage space divided to a plurality of contiguous storage segments, said plurality of separate storage drives stores a plurality of pairs of replicas, each said pair of replicas is of a data unit of a plurality of data units of a dataset; and a plurality of storage management modules each installed to monitor another of said plurality of said storage drives and to detect locally a storage failure thereof, said storage failure is related to a first member of a certain pair from said plurality of pairs;

wherein each one of said plurality of storage management modules forwards a message indicative of said failure to trigger a storage of a second member of said certain pair into a respective said memory support component that is electronically connected via a respective said connection to a second of said plurality of storage drives.

16. The system of claim 15, wherein each one of said memory support components is electronically connected via a wire to monitor an input/output (I/O) controller of a single storage drive of said plurality of separate storage drives.

17. The system of claim 15, wherein each one of said plurality of separate storage drives is control by a different hosting computing unit that is connected to said network.

18. The system of claim 15, wherein said plurality of pairs of replicas are distributed among said plurality of separate storage drives so that replicas of any of said plurality of pairs are stored in contiguous storage segments of different storage drives and so that any couple of said plurality of storage drives shares only one of said plurality of pairs.

19. A method of data replica recovery, comprising:

providing a distributed storage comprising a plurality of separate storage drives which are connected to a network, each one of said plurality of storage drives having a storage space divided to a plurality of contiguous storage segments and is electronically connected to a memory support component via a connection;

storing a plurality of pairs of replicas in said plurality of storage drives, each said pair includes first and second replicas of a data unit of a plurality of data units of a dataset;

maintaining in each said memory support component an erasure code of a subset of said plurality of replicas, said subset being stored in respective said plurality of contiguous storage segments of a certain of said plurality of storage drives; and locally detecting in a storage failure of a certain storage drive from said plurality of storage drives; and using a combination of said erasure code plurality of replicas and data from other storage drives of said plurality of storage drives to recover said certain storage drive.

20. The method of claim 19, wherein said plurality of pairs of replicas are stored so that replicas of any of said plurality of pairs are stored in contiguous storage segments of different storage drives and so that any couple of said plurality of storage drives shares only one of said plurality of pairs.

* * * * *